Aug. 30, 1966 R. J. KELLER 3,270,178
WELDING NOZZLE
Filed Aug. 3, 1965 2 Sheets-Sheet 1
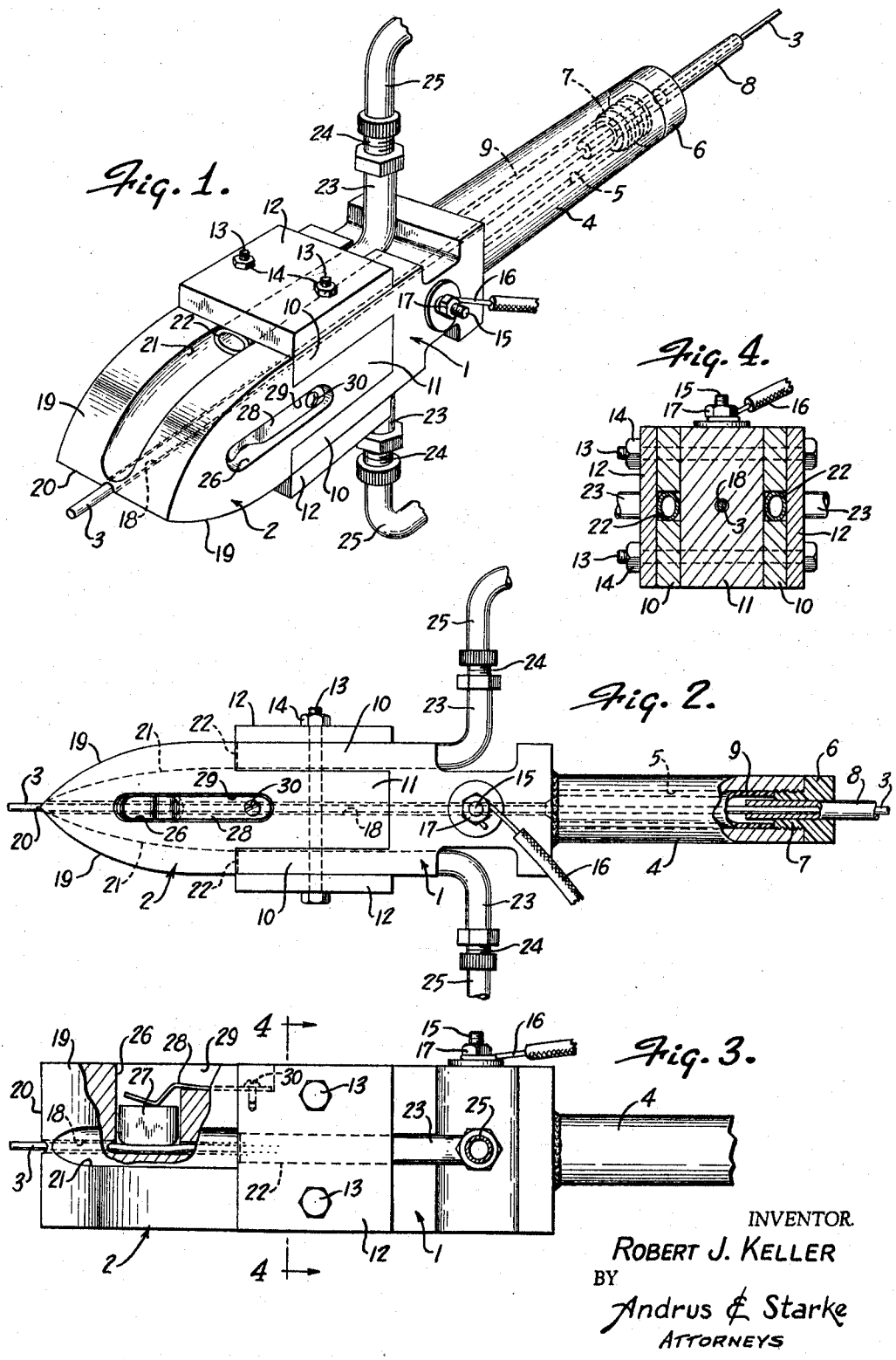
INVENTOR.
ROBERT J. KELLER
BY
Andrus & Starke
ATTORNEYS Aug. 30, 1966 R. J. KELLER 3,270,178
WELDING NOZZLE Filed Aug. 3, 1965 2 Sheets-Sheet 2

INVENTOR.
ROBERT J. KELLER
BY
Andrus & Starke
ATTORNEYS

United States Patent Office 3,270,178
Patented August 30, 1966

3,270,178
WELDING NOZZLE
Robert J. Keller, Milwaukee, Wis., assignor, by mesne assignments, to Harnischfeger Corporation, West Milwaukee, Wis., a corporation of Wisconsin
Filed Aug. 3, 1965, Ser. No. 477,673
6 Claims. (Cl. 219—74)

This application is a continuation-in-part of U.S. application Serial No. 290,790, filed June 26, 1963, now abandoned.

This invention relates to a welding nozzle and more particularly to a welding nozzle having exposed peripheral curvilinear surfaces to conduct a shielding gas to the arc.

In welding processes using a consumable electrode, the arc is frequently shielded with a gas, such as carbon dioxide, argon, helium or the like to prevent oxidation of the molten weld metal. Generally, this shielding gas is conducted to the arc through a small tube or conduit attached to the nozzle or through a passage formed in the nozzle. During the welding operation, weld spatter frequently collects in the shielding gas tube or passage to partially close off the tube and deflect the flow of shielding gas. In addition, weld spatter is very difficult to remove from the shielding gas conduit after the welding operation is completed.

The present invention is directed to a consumable electrode welding nozzle which eliminates spatter-clogging problems and insures a more uniform flow of shielding gas to the arc. More specifically, the welding nozzle of the invention includes a head having an opening to conduct the consumable electrode wire to the arc. The peripheral surfaces of the head are curved or tapered toward the tip to provide the head with a generally bullet-shaped profile. The curved peripheral surfaces of the head may be provided with a plurality of grooves which extend longitudinally of the head and terminate at the outlet of the electrode passage. Shielding gas conduit means connect from the main body of the nozzle to the upper end of the curved peripheral surfaces of the head and the shielding gas flows downwardly, converging toward the arc, following the contour of the grooves, to the arc.

The welding nozzle of the invention, by having the tapered end profile, provides a minimum target for weld spatter. In addition, the surfaces which guide the shielding gas to the arc are completely exposed in the vicinity of the arc and cannot be completely closed by weld spatter. Any weld spatter which does collect on the exposed gas guiding surfaces can be readily removed after the welding operation.

To further reduce the tendency for weld spatter to collect on the nozzle, the head is chromium plated to provide a smooth external surface.

This invention utilizes the fact that a gas flowing tangentially to a curved surface tends to follow the surface. In this way, the shielding gas is caused to converge at the electrode tip where it is needed, even though not externally confined.

Other objects and advantages will appear in the course of the following description.

The drawings illustrate the best mode presently contemplated of carrying out the invention.

In the drawings:

FIG. 1 is a perspective view of an early embodiment of the welding nozzle of the invention with parts broken away in section;

FIG. 2 is a side elevational view of FIG. 1;

FIG. 3 is a top plan view with parts broken away in section of the welding nozzle shown in FIG. 1;

FIG. 4 is a transverse section taken along line 4—4 of FIG. 3;

Figure 5:
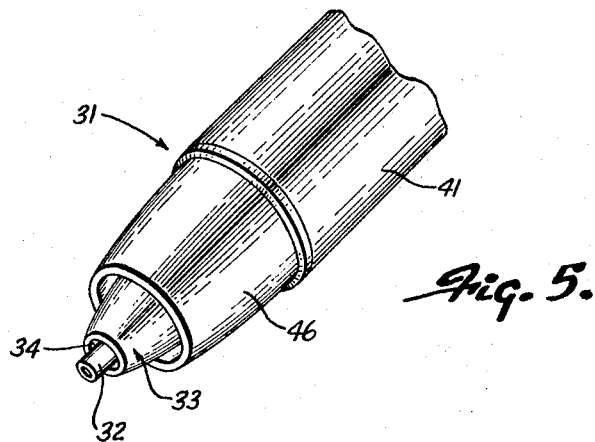
FIG. 5 is a perspective view showing a second nozzle design utilizing the concept of the invention.

The drawings illustrate a welding nozzle for a gas shielded, consumable electrode welding process which includes a body 1 and a head 2 which are adapted to conduct the consumable electrode wire 3 to the arc. In the welding operation, arc is established between the lower end of the electrode wire 3 projecting out of the head 2 and the work-piece.

The body 1 is formed of an electrical conductive material, such as copper, and includes an upper cylindrical section 4 having an axial passage 5. A plug 6, formed of an electrically insulating material, bears against the outer end of the section 4 and the plug is provided with an end 7 of reduced diameter which is threaded within the passage 5 in section 4.

Plug 6 is provided with an axial opening which receives a tube 8, and the consumable electrode is guided through the tube into the passage 5.

To prevent electrical contact between the consumable electrode 3 and the body 1, an electrically insulating tube 9 is located within the axial passage 5 in section 4, and the electrode passes through the insulating tube 9 to the head 2.

The lower end of the body is provided with two pairs of spaced fingers 10 and a tongue 11 of the head 2 is received between corresponding pairs of the fingers. Plates 12 are located on opposite sides of the body 1 and the plates 12, fingers 10 and tongue 11 are connected together by bolts 13, which extend through aligned openings in the members. Nuts 14 are threaded onto the bolts 13.

To apply electrical energy to the welding nozzle, a stud 15 is welded or otherwise secured to the body 1, and an electrical terminal 16 is secured to the stud by nut 17 and is adapted to connect the body 1 to a suitable source of electrical power.

The head 2 is provided with an axial passage 18 which is in alignment with the passage 5 of the body 1 and serves to conduct the consumable electrode 3 to the arc.

As best shown in FIG. 1, the opposite peripheral surfaces 19 of head 2 are curved or tapered toward the lower end and provide a chisel-like tip 20 for the head 6. Each surface 19 is provided with a longitudinal groove 21 which terminates at the tip 20. The grooves 21 have a semicircular cross section and the upper end of each groove communicates with a tube 22 which is located in the space between corresponding pairs of fingers 10.

To supply a shielding gas to the arc, a gas tube 23 is connected to the upper end of each of the tubes 22 and the outer end of each tube 23 is connected by a fitting 24 to a flexible supply conduit 25. The supply conduits 25 are connected to a suitable source of shielding gas. The conduits 25 may individually be connected to the source of gas or they may be connected to a common supply line.

With this construction, the shielding gas flows through the flexible conduits 25, tubes 23, tubes 20 to the grooves 21. Due to the characteristics of fluid flow, the shielding gas will follow the curved contour of the bottom of the grooves 21 and will be directed to the arc.

To supply electrical energy to the consumable electrode 3, the head 2 is provided with a recess 26 which communicates with the axial passage 18 in the head. A block 27 is located within the recess 26 and bears against the electrode 3. The block 27 is urged against the electrode 3 by a spring clip 28. The upper end of the spring clip 28 is located within a longitudinal recess 29 formed in the head and is secured within the recess by a screw 30. As best shown in FIG. 3, the lower end of the spring clip forces the block 27 radially inward against the electrode wire 3 to provide a positive electrical contact.

With the welding nozzle illustrated in FIGS. 1–4, the shielding gas is supplied to the arc through the grooves 21 formed in the curved surfaces 19 of the welding head. The grooves 21 are open, or generally semi-circular in cross section, so that welding spatter will not close off the flow of shielding gas during the welding operation. In addition, as the grooves are open, they can be more readily cleaned of spatter or other foreign materials after the welding operation.

The lower end of the head 2 is tapered to a generally sharp chisel tip 20, as best shown in FIG. 1. This sharpened end provides a smaller target area for spatter and again reduces the amount of spatter which adheres to the nozzle during the welding operation. As will be seen below, it is also contemplated that all surfaces of the head may be tapered inwardly to provide the tip with a bullet shape. In this case, shielding gas grooves, such as groove 21, can be provided in one or more of the tapered surfaces, or they can be eliminated entirely, as shown in FIG. 5.

Figure 6:
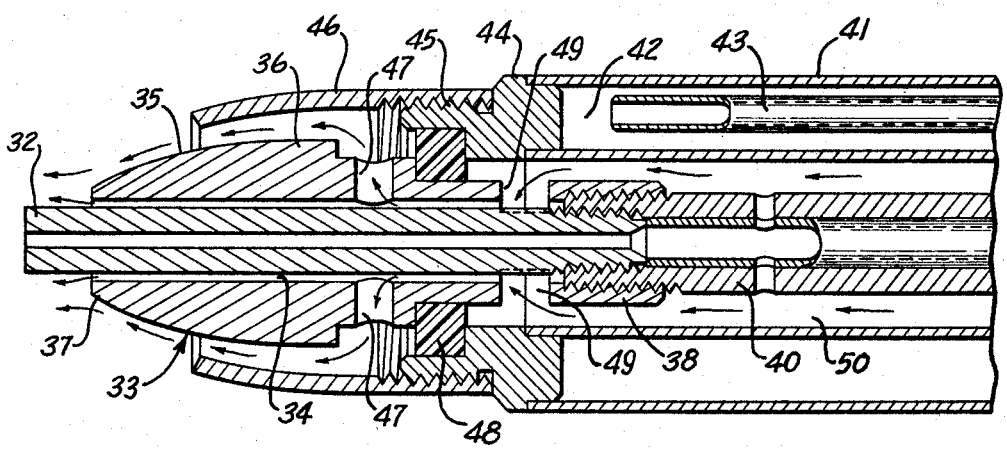
FIG. 6 is a sectional view of the nozzle shown in FIG. 5.

FIG. 5 and FIG. 6 illustrate a more portable welding nozzle end 31 which is particularly adapted for use in a manual arc welding gun. As shown in FIG. 5, the nozzle end 31 includes an electrode contact tube 32, a bullet-shaped nose 33 having an axial passage 34 through which the contact tube 32 extends, and a peripheral curvilinear outer surface 35 which tapers from a thicker intermediate portion 36 to a relatively narrow outer end 37. The bullet-shaped nose 33 is threadably received at its inner end 38 on contact tube body 40 of contact tube 32.

As best shown in FIG. 6, the contact tube body 40 is housed in a water cooled cylindrical jacket 41, which includes water cooling chambers 42 and water conduits 43 for circulating fluid coolant through the jacket 41. Outer end 44 of jacket 41 includes an externally threaded lip 45 adapted to receive an internally threaded gas cup 46. The gas cup 46 extends outwardly, partially surrounding the intermediate portion 36 of the bullet-shaped nose 33. The gas cup 46 serves to direct the flow of shielding gas tangentially along the tapered surface 35 of the nose 33 as the gas emerges from openings 47 provided in the intermediate portion 36 of the nose 33.

The nose 33 and the contact tube 32 are insulated from the gas cup 46 and the jacket 41 by means of an annular insulating ring 48, which is seated inside the outer end of the jacket 41. The ring 48 may be polytetrafluoroethylene, nylon or some similar heat resistant insulating material.

The arrows in FIG. 6 show the flow path of the shielding gas. As indicated, the shielding gas enters a plurality of orifices 49 in the inner end 38 of nose 33 from annular gas conduit 50 defined by the space between jacket 41 and the contact tube body 40 extending therethrough. Gas then flows down to the arc through axial passage 34, and most important, along the curvilinear surface 35. As mentioned above, the sole purpose of the gas cup 46 is to establish uniform outward tangential flow of shielding gas around the bullet-shaped nose 33.

Other means of providing tangential outward flow of shielding gas are also contemplated, and are considered to be within the scope of the invention. The nozzle end 31, and the head 2 are but two illustrations of the inventive concept of applying the curved surface guiding technique to shielding gas flow in an arc welding nozzle.

While the welding nozzles incorporating the invention have been particularly useful with carbon dioxide shielding gas, the welding nozzle may be used with any type of shielding gas, such as helium, argon, mixtures of carbon dioxide and carbon monoxide, and the like.

Various modes of carrying out the invention are contemplated as being within the scope of the following claims particularly pointing out and distinctly claiming the subject matter which is regarded as the invention.

I claim:

1. In an arc welding apparatus, a welding nozzle having an end and being formed with a passage terminating at said end and adapted to conduct an electrode to an arc, said nozzle having a peripheral groove extending generally longitudinally of the nozzle and said groove being curved longitudinally and terminating at said end adjacent said passage, and means for supplying a shielding gas to the groove with the gas flowing within the groove and following the curved contour of the groove to the arc.

2. In an arc welding apparatus, a nozzle having an end and being formed with a longitudinal passage terminating at said end and adapted to conduct a consumable electrode to the arc, a portion of the peripheral surface of said nozzle being tapered inwardly at said end toward the longitudinal axis of the nozzle and said portion having an elongated groove terminating at said end adjacent said passage, and means for supplying a shielding gas to the groove with the gas flowing within the groove and following the contour of the groove to the arc.

3. In an arc welding apparatus, a nozzle having a longitudinal passage terminating at the lower end and adapted to conduct a consumable electrode to the arc, opposite peripheral surfaces of said nozzle being tapered inwardly toward the longitudinal axis of the nozzle to provide said lower end with a chisel-shaped contour, each of said opposite surfaces having an open groove extending generally longitudinally of the nozzle and terminating at said lower end adjacent the passage, and means communicating with the upper end of the grooves for supplying a shielding gas to the grooves with the gas flowing within the grooves and following the curved contour of the grooves to the arc.

4. The structure of claim 3 in which a tube is disposed within the upper end of each groove and the lower end of the tube terminates a substantial distance above the lower end of the nozzle, and means for connecting each tube to a source of shielding gas.

5. In an arc welding apparatus, a nozzle having a longitudinal passage terminating at the lower end and adapted to conduct a consumable electrode to the arc, said nozzle having a peripheral portion curved inwardly toward the axis of the nozzle with said curved portion terminating at the lower end of the nozzle, said portion having an open groove extending generally longitudinally of the nozzle and terminating at the lower end of said nozzle adjacent the passage, said groove increasing in depth in a direction away from said lower end, and means for supplying a shielding gas to the groove with the gas flowing within the open groove to said arc.

6. In an arc welding apparatus, a nozzle having a longitudinal passage terminating at the outer end and adapted to conduct a consumable electrode to the arc, said nozzle having a peripheral portion curved inwardly toward the axis of the nozzle with said curved portion terminating at the outer end of the nozzle, said portion having a curvilinear surface extending generally longitudinally of the nozzle and terminating at the outer end of said nozzle adjacent the passage, said surface increasing in depth in a direction away from said outer end, and means for supplying a shielding gas tangentially to the surface with the gas flowing along the open curvilinear surface to said arc.

References Cited by the Examiner

UNITED STATES PATENTS

| | | | |
|---|---|---|---|
| 2,902,587 | 9/1959 | Bernard | 219—74 |
| 2,951,931 | 9/1960 | Danhier | 219—74 |
| 3,007,032 | 10/1961 | Whiteman | 219—130 |

RICHARD M. WOOD, *Primary Examiner.*